United States Patent
Hoshi et al.

(10) Patent No.: US 12,304,752 B2
(45) Date of Patent: May 20, 2025

(54) CONVEYANCE DEVICE

(71) Applicant: HITACHI HIGH-TECH CORPORATION, Tokyo (JP)

(72) Inventors: Ryosuke Hoshi, Tokyo (JP); Yasuaki Aoyama, Tokyo (JP); Satoru Kaneko, Tokyo (JP); Hiroyuki Kobayashi, Tokyo (JP); Hiroshi Watanabe, Tokyo (JP); Shinji Azuma, Tokyo (JP); Kuniaki Onizawa, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 134 days.

(21) Appl. No.: 18/029,398

(22) PCT Filed: Aug. 25, 2021

(86) PCT No.: PCT/JP2021/031206
§ 371 (c)(1),
(2) Date: Mar. 30, 2023

(87) PCT Pub. No.: WO2022/085299
PCT Pub. Date: Apr. 28, 2022

(65) Prior Publication Data
US 2023/0365354 A1    Nov. 16, 2023

(30) Foreign Application Priority Data
Oct. 19, 2020 (JP) .................................. 2020-175128

(51) Int. Cl.
*B65G 54/02* (2006.01)
*B65G 43/00* (2006.01)
(Continued)

(52) U.S. Cl.
CPC .............. *B65G 54/02* (2013.01); *B65G 43/00* (2013.01); *G01N 35/04* (2013.01); *H01F 7/206* (2013.01); *G01N 2035/0477* (2013.01)

(58) Field of Classification Search
CPC ...... B65G 43/00; B65G 54/02; B65G 54/025; B65G 21/2018; B65G 15/28; B65G 17/46;
(Continued)

(56) References Cited

U.S. PATENT DOCUMENTS 10,160,609 B2 * 12/2018 Malinowski ........... B65G 54/02
2014/0234065 A1 * 8/2014 Heise ..................... B65G 54/02
414/749.2
(Continued)

FOREIGN PATENT DOCUMENTS

DE    102011089417 B4 *  5/2017  ............... H02K 1/02
JP           0616239 A    1/1994
(Continued)

OTHER PUBLICATIONS

Extended European Search Report received in corresponding European Application No. 21882440.7 dated Mar. 1, 2024.
(Continued)

*Primary Examiner* — Gene O Crawford
*Assistant Examiner* — Muhammad Awais
(74) *Attorney, Agent, or Firm* — MATTINGLY & MALUR, PC

(57) ABSTRACT

An objective of the present invention is to provide a conveyance device that can increase inductance variation while suppressing the lowering of thrust. A conveyance device 1 conveys an article 110 to be conveyed. The article 110 to be conveyed can be conveyed by a magnetic force. The conveyance device 1 comprises a plurality of electromagnets 25a and 25b. Each electromagnet 25a, 25b comprises: teeth
(Continued)

22, 22a, 22b, 22c and 22e including a magnetic body; and windings 21, 21a and 21b wound around the teeth 22, 22a, 22b, 22c and 22e. The conveyance device 1 comprises a yoke 26 for magnetically coupling the electromagnets 25a and 25b, and driving circuits 50a and 50b for supplying current to the windings 21, 21a and 21b. The teeth 22, 22a, 22b, 22c and 22e have a cavity 27 extending in the axial direction.

8 Claims, 10 Drawing Sheets

(51) Int. Cl.
*G01N 35/04* (2006.01)
*H01F 7/20* (2006.01)

(58) Field of Classification Search
CPC .... H02K 1/08; H02K 2201/18; H02K 41/031; H02K 1/14; G01N 2035/0406; G01N 2035/0477; G01N 35/04; G01N 2035/0475; H01F 7/206
USPC ...................................... 198/618, 619, 502.3
See application file for complete search history.

(56) References Cited

U.S. PATENT DOCUMENTS

| 2016/0268883 | A1* | 9/2016 | Kakihara .............. H02P 25/064 |
| 2017/0101277 | A1 | 4/2017 | Malinowski |
| 2021/0398723 | A1 | 12/2021 | Aoyama et al. |
| 2022/0306405 | A1 | 9/2022 | Aoyama et al. |

FOREIGN PATENT DOCUMENTS

| JP | 2016171669 A | 9/2016 | |
| JP | 2017077971 A | 4/2017 | |
| JP | 2017102103 A | 6/2017 | |
| JP | 2020201167 A | 12/2020 | |
| WO | WO-2020137182 A1 * | 7/2020 | ............. B65G 54/02 |

OTHER PUBLICATIONS

International Search Report of PCT/JP2021/031206 dated Nov. 22, 2021.

* cited by examiner

[FIG. 1]
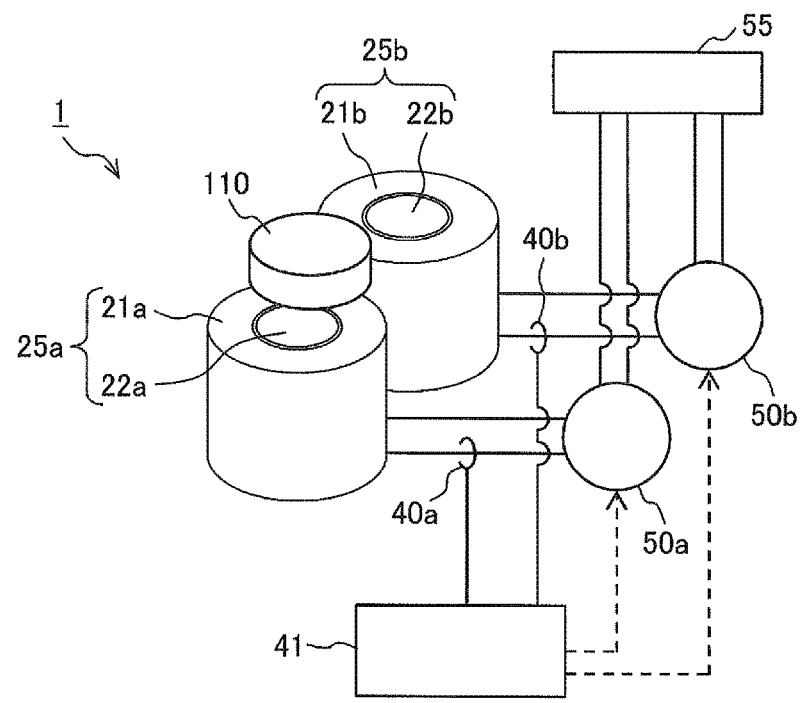

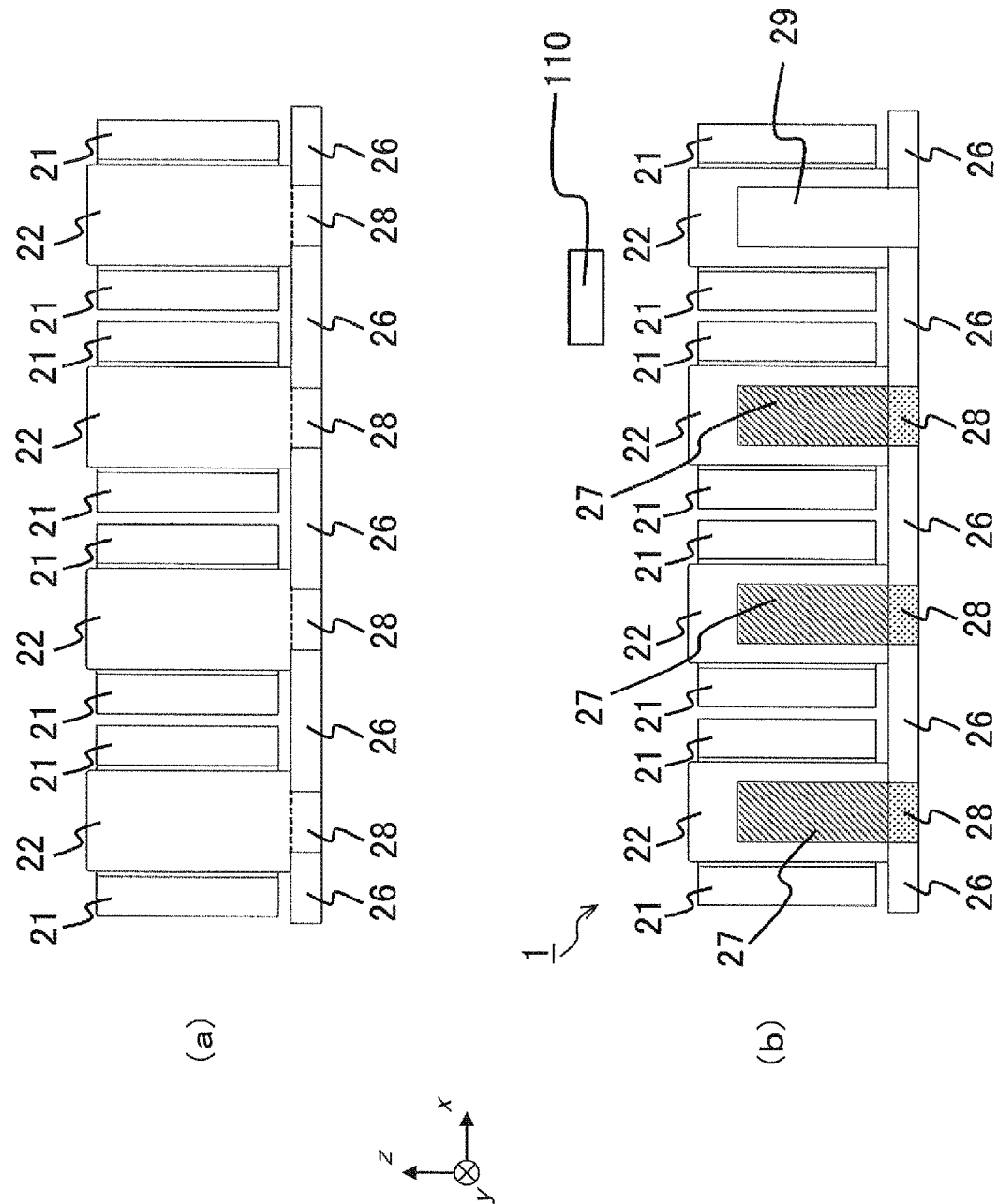
[FIG. 2]

[FIG. 3]
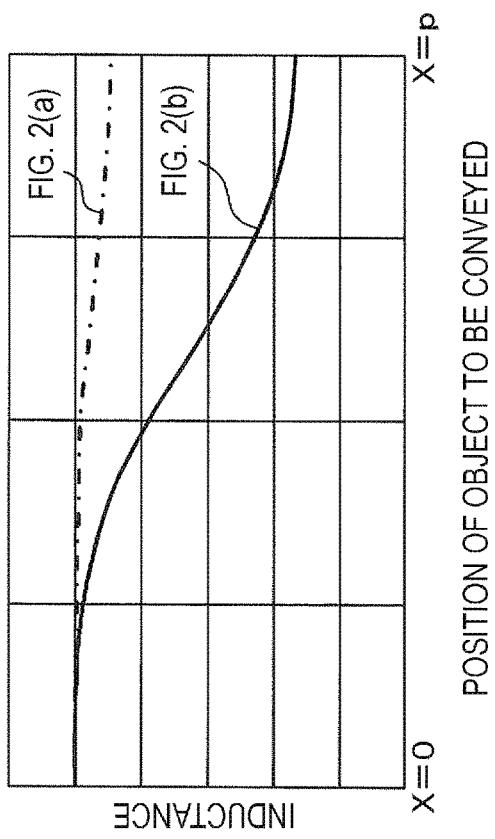
(b)
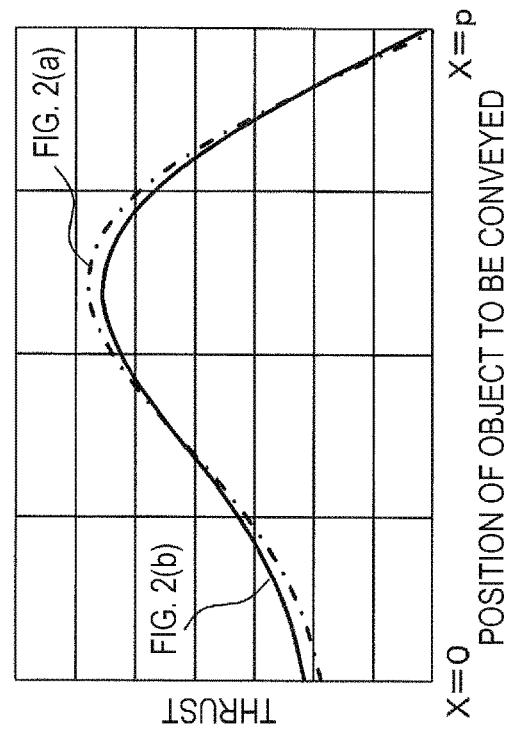
(a)

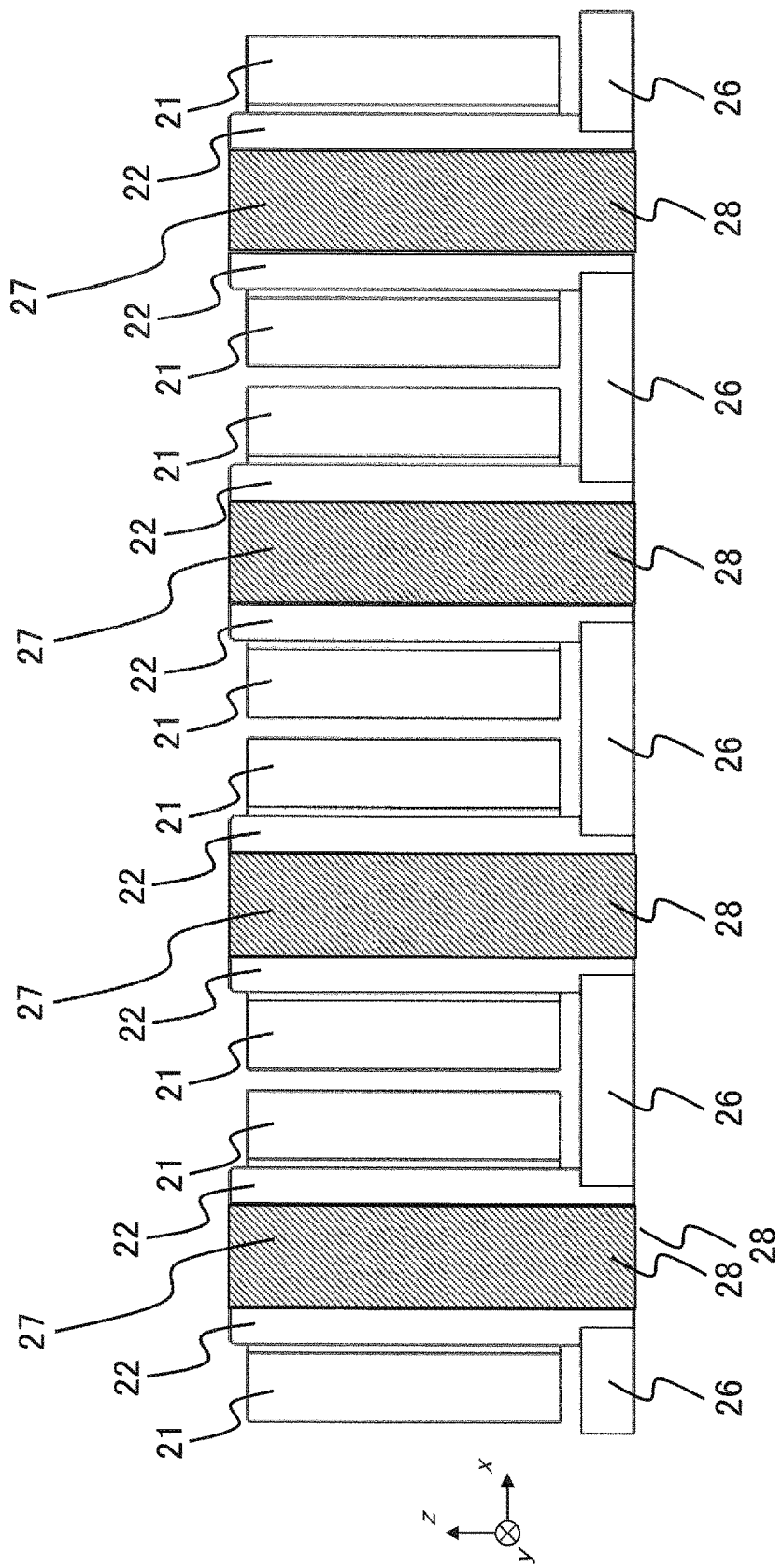
[FIG. 4]

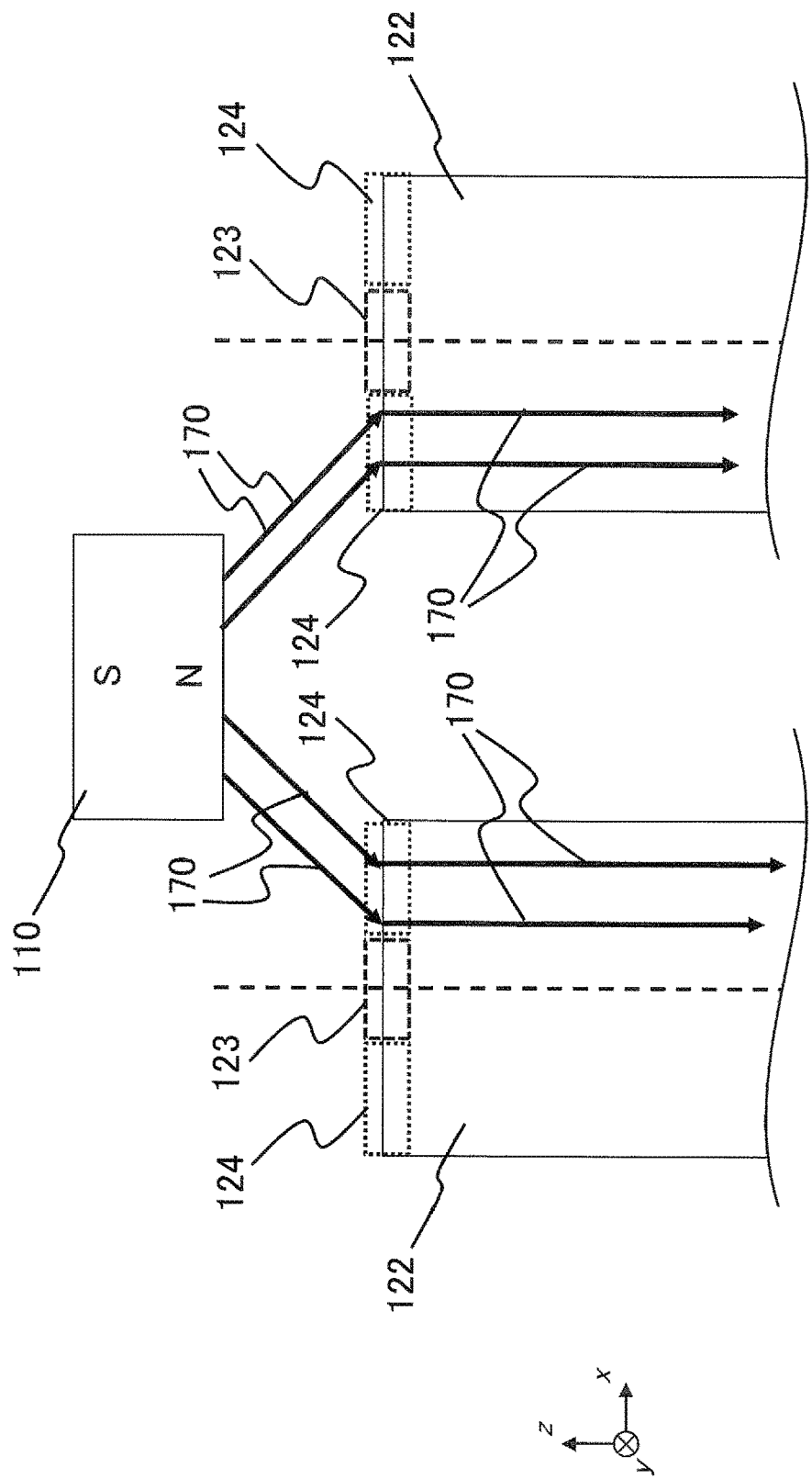
[FIG. 5]

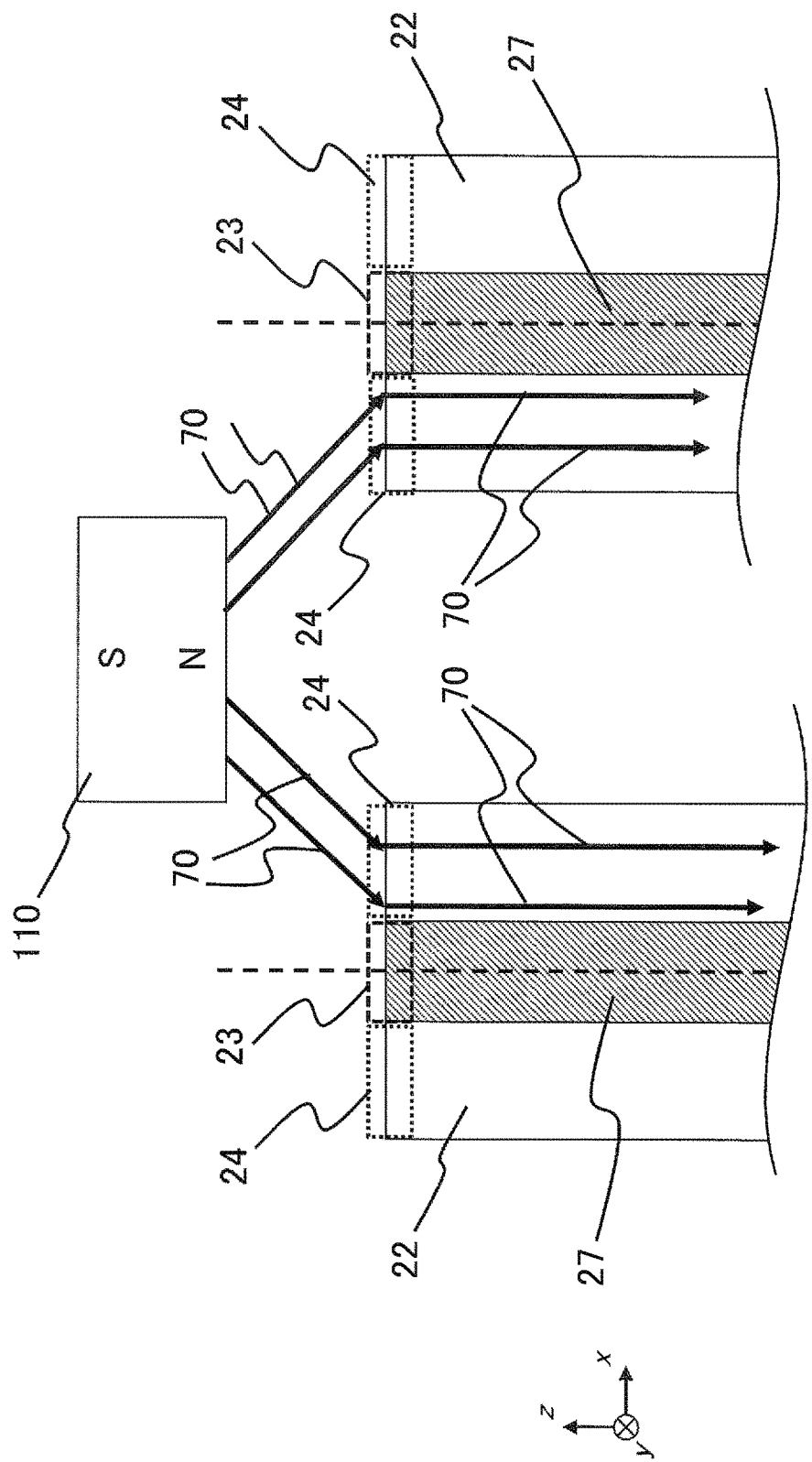
[FIG. 6]

[FIG. 7]
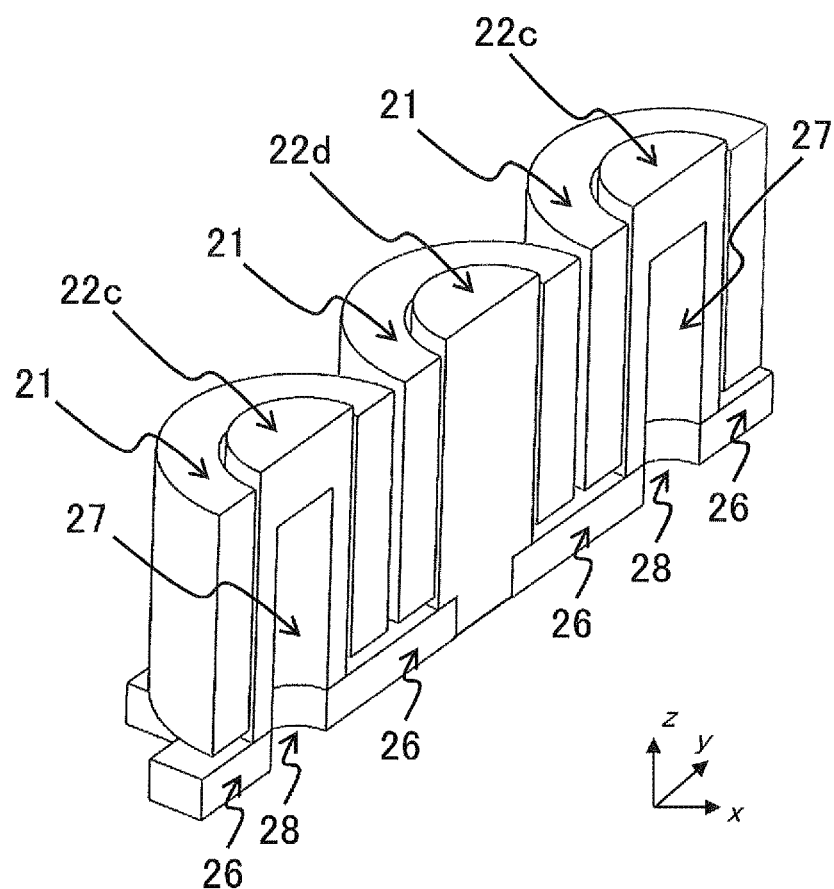

[FIG. 8]
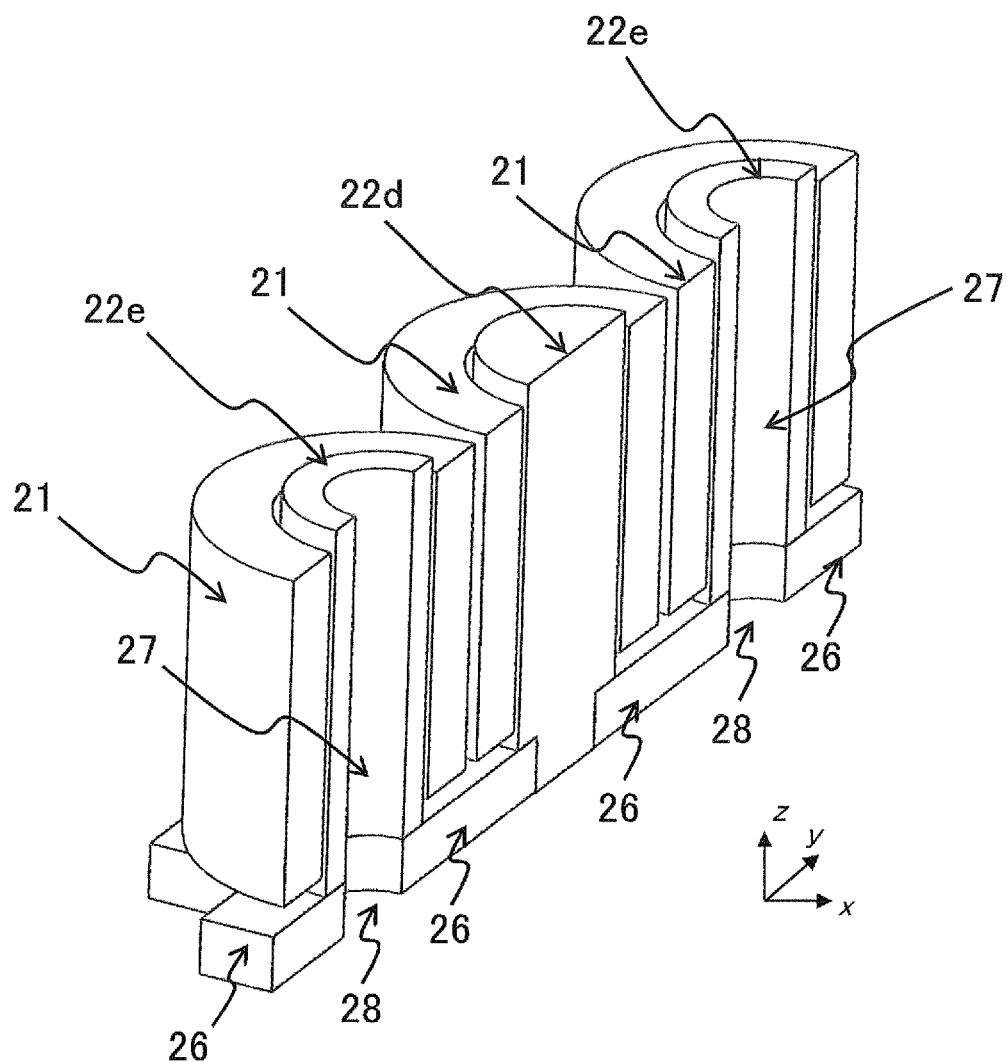

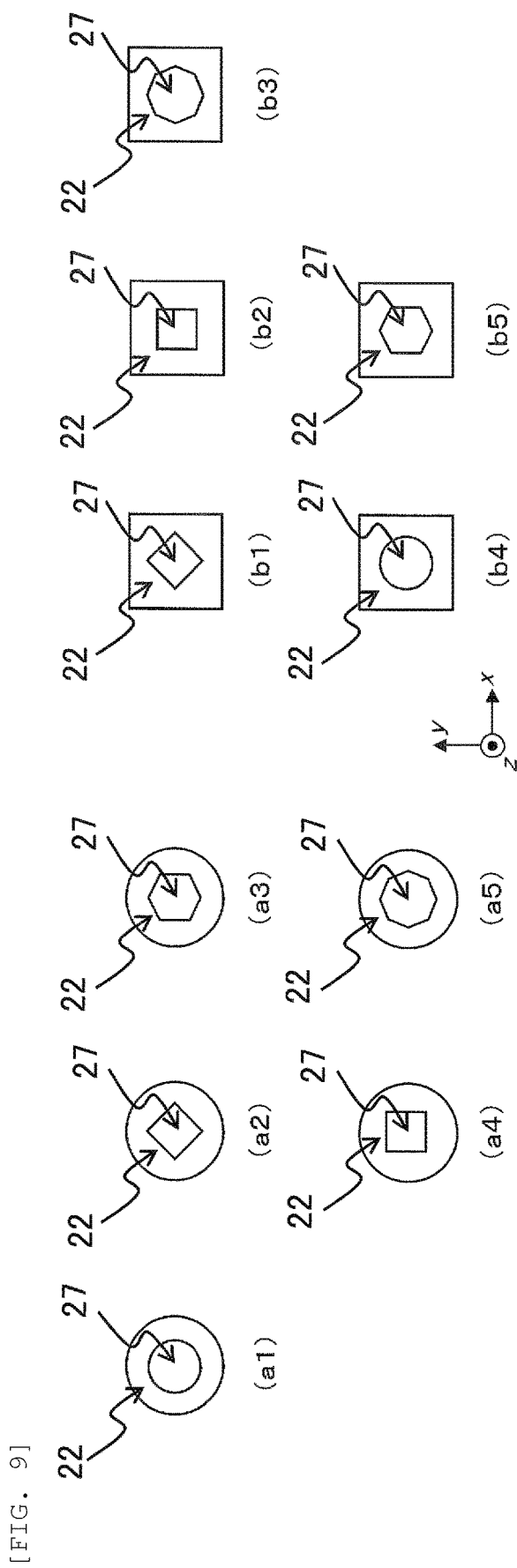
[FIG. 9]

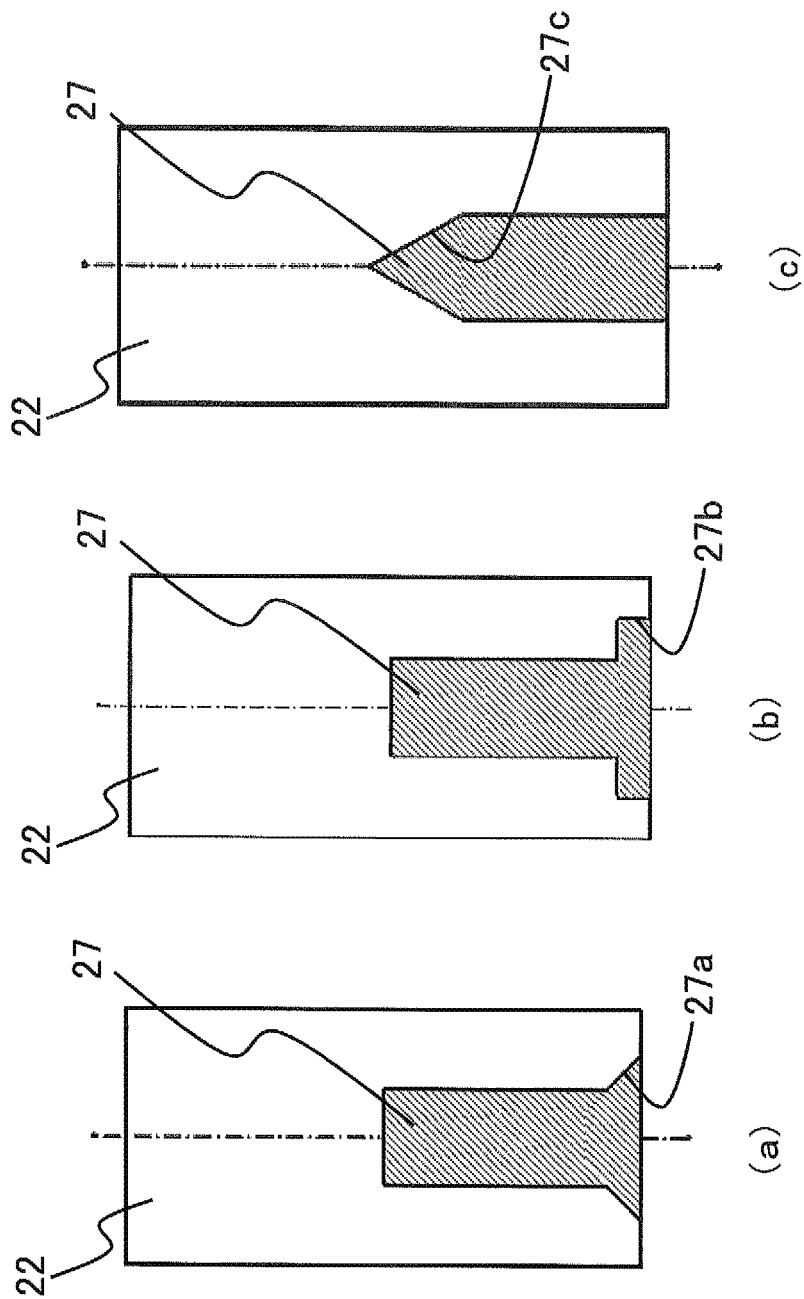
[FIG. 10]

CONVEYANCE DEVICE

TECHNICAL FIELD

The present invention relates to a conveyance device. The conveyance device is used for, for example, a specimen analysis system configured to analyze biological samples such as blood and urine, and a specimen pretreatment device configured to perform pretreatment necessary for analysis.

BACKGROUND ART

In a specimen analysis system configured to analyze biological samples such as blood, plasma, serum, urine, and other body fluids (hereinafter sometimes referred to as "specimens"), in order to inspect a specified analysis item for each specimen, a device having a plurality of functions is connected and each step is automatically processed. In other words, in the specimen analysis system, analysis units in a plurality of analysis fields such as biochemistry and immunology are connected by a conveyance line, and a plurality of analyses are performed collectively.

A conveyance method of the conveyance line includes (1) a method by a belt conveyor and (2) a method using an electromagnetic attraction force as thrust. In the example of the method (2), a permanent magnet is provided in a container carrier such as a holder that holds a specimen, and an electromagnetic attraction force generated by supplying a current to a winding of a magnetic circuit provided on a transfer surface is used as thrust for the container carrier. The magnetic circuit includes teeth disposed in a lattice shape, windings attached to the teeth, and a yoke connecting each of the teeth. These conveyance methods have a container carrier detection device provided therein and configured to detect the position of a magnetically active device provided in the container carrier.

In PTL 1, a container carrier detection device is provided to detect the presence and position of the container carrier located on a conveyance plane. It is described that a printed circuit board having a plurality of IR-based reflective light barriers is provided.

In PTL 2, a laboratory sample distribution system includes a transfer surface. A plurality of electromagnetic actuators are disposed below the transfer surface. Furthermore, a plurality of position sensors are distributed on the transfer surface. It is described that the position sensor is embodied as a Hall sensor.

In order to reduce the loss due to winding, it is desirable that an electromagnetic attraction force per current is large. In order to improve the electromagnetic attraction force, it is effective to increase the tooth diameter so as to increase the area facing a magnet. Furthermore, in order to reduce costs, it is desirable to eliminate the detection device described in PTL 1 and PTL 2 and implement a sensorless method.

One of the sensorless methods is to use a change in inductance in a winding of a magnetic circuit. In this method, the amount of a magnetic flux of a permanent magnet interlinking with the winding increases when a container carrier approaches teeth of the energized winding. Accordingly, the magnetic flux in the teeth is saturated and the inductance of the winding is changed. That is, the inductance has dependence on the position of the permanent magnet provided in the container carrier, which is used for detection. When position detection is performed without a sensor, detection accuracy is improved by increasing a change in inductance.

CITATION LIST

Patent Literature

PTL 1: JP2017-77971A
PTL 2: JP2017-102103A

SUMMARY OF INVENTION

Technical Problem

However, in the related art, when a change in inductance is increased, thrust deteriorates, which causes a trade-off problem.

In order to improve a change in inductance, it is effective, for example, to reduce the diameter of a tooth and form a structure that facilitates a magnetic saturation phenomenon. However, when the diameter of the tooth is reduced in order to improve the change in inductance, an electromagnetic attraction force is reduced as described above, which results in deterioration in thrust.

The present invention has been made to solve the above-described problems, and an object of the present invention is to provide a conveyance device capable of increasing a change in inductance while suppressing deterioration in thrust.

Solution to Problem

An example of a conveyance device according to the present invention is a conveyance device configured to convey an object to be conveyed, in which the object to be conveyed is conveyable by a magnetic force, the conveyance device includes:

a plurality of electromagnets, each of the electromagnets including a tooth and a winding wound around the tooth, the tooth including a magnetic body;

a yoke configured to magnetically couple the respective electromagnets; and a driving circuit configured to supply a current to the winding, and the tooth has a cavity formed to extend in an axial direction.

This description includes the disclosed contents of Japanese Patent Application No. 2020-175128, which is the basis of priority of this application.

Advantageous Effects of Invention

With a conveyance device according to the present invention, it is possible to increase a change in inductance while suppressing deterioration in thrust. Other problems and effects will be clarified by descriptions of the following embodiments.

BRIEF DESCRIPTION OF DRAWINGS

FIG. 1 is a schematic configuration view of a conveyance device according to an embodiment 1 of the present invention.

FIG. 2 is a schematic cross-sectional comparison view showing a configuration of the conveyance device in FIG. 1.

FIG. 3 is a graph comparing characteristics of thrust and inductance in a conveyance device of (a) of FIG. 2 and a conveyance device of (b) of FIG. 2.

FIG. 4 is a schematic cross-sectional view showing a configuration example of a conveyance device according to an embodiment 2.

FIG. 5 is a view schematically showing the flow of a magnetic flux between an object to be conveyed and a tooth in (a) of FIG. 2.

FIG. 6 is a view schematically showing the flow of a magnetic flux between an object to be conveyed and a tooth in (b) of FIG. 2.

FIG. 7 is a schematic view showing a configuration example of a conveyance device according to an embodiment 3.

FIG. 8 is a schematic view showing another configuration example of the conveyance device according to the embodiment 3.

FIG. 9 is a schematic cross-sectional view showing various examples of a tooth and a cavity according to an embodiment 4.

FIG. 10 is a schematic cross-sectional view showing various examples of a tooth and a cavity according to an embodiment 5.

DESCRIPTION OF EMBODIMENTS

Hereinafter, embodiments of the present invention will be described with reference to the drawings. In addition, the present invention is not limited to the following embodiments, and the shape, arrangement, and other configurations of the embodiments may be changed.

Embodiment 1

FIG. 1 is a schematic configuration view of a conveyance device according to an embodiment 1 of the present invention. The conveyance device 1 of the present invention is a conveyance device configured to convey an object to be conveyed 110. The conveyance device 1 forms a conveyance path along which the object to be conveyed 110 moves. The conveyance path is formed, for example, on the plane, and as a specific example, the same is formed on the horizontal plane.

The conveyance device 1 includes electromagnets 25a and 25b configured to convey the object to be conveyed 110. The electromagnets 25a and 25b are provided, for example, on a surface of a plate (not shown) that forms the conveyance path, the surface being opposite to the conveyance path. The conveyance device 1 also includes driving circuits 50a and 50b configured to respectively supply currents to the electromagnets 25a and 25b. A plurality of the electromagnets 25a and 25b (two in this embodiment) are provided, and generally a large number of electromagnets are arranged in, for example, a lattice shape. A power source 55 is connected to the driving circuits 50a and 50b. The power source 55 is, for example, a battery, and supplies direct current, but may also supply pulse current. Current detectors 40a and 40b are provided between the electromagnets 25a and 25b and the driving circuits 50a and 50b. The current detectors 40a and 40b are connected to a calculation unit 41.

Each configuration will be described in detail below. The object to be conveyed 110 can be conveyed by a magnetic force, and includes a magnet (for example, a permanent magnet). As a specific example, a permanent magnet (not shown) is built in the bottom surface of the object to be conveyed 110 (that is, the surface facing the conveyance path). An example of the object to be conveyed 110 is a specimen holder. The specimen holder holds specimen containers one by one. The specimen container may be a test tube containing a liquid specimen (or may be reagent) or may be a sample cell. Another example of the object to be conveyed 110 is a specimen rack. The specimen rack can hold a plurality of specimen containers. A neodymium alloy, ferrite, or the like is preferably used as the permanent magnet provided on the object to be conveyed 110. An electromagnet may be used instead of the permanent magnet, or a magnetic body (for example, a soft magnetic body) may be used.

A conveyance path (not shown) is provided between the object to be conveyed 110 and the electromagnets 25a and 25b. For example, a plate forming a conveyance path may be disposed, and the conveyance path may be formed on one side of the plate. The object to be conveyed 110 slides and moves on the conveyance path by action of a magnetic force.

The electromagnets 25a and 25b respectively include teeth 22a and 22b. The teeth 22a and 22b contain a magnetic body, and are formed of, for example, a ferromagnetic body. The electromagnets 25a and 25b also respectively include windings 21a and 21b respectively wound around the teeth 22a and 22b. An axis (for example, a central axis. A specific example will be described later with reference to FIG. 10) can be defined for the teeth 22a and 22b, and the windings 21a and 21b are respectively wound along the outer peripheries of the teeth 22a and 22b, for example, around the axes of the teeth 22a and 22b. Although each of the teeth 22a and 22b has a cylindrical shape in FIG. 1, the same is not limited to the cylindrical shape and may have a prismatic shape.

The windings 21a and 21b of the electromagnets 25a and 25b are connected to the driving circuits 50a and 50b, respectively, and the driving circuits 50a and 50b supply currents to the windings 21a and 21b, respectively. Each of the electromagnets 25a and 25b is supplied with a current to generate a magnetic field. Each of the ends (for example, upper ends) of the teeth 22a and 22b are disposed to face the conveyance path or the object to be conveyed 110. Particularly, each of the teeth 22a and 22b according to this embodiment has one end having a surface facing the conveyance path or the object to be conveyed 110. A part of the magnetic field is generated so as to pass through (for example, approximately in the vertical direction) the one end (described later with reference to FIG. 6 and the like). This magnetic field generates a thrust in the permanent magnet of the object to be conveyed 110.

Each of the current detectors 40a and 40b has a function of detecting a current flowing through a corresponding one of the windings 21a and 21b of the electromagnets 25a and 25b, and has a function of sending a detected current value to the calculation unit 41. The specific structure of the current detectors 40a and 40b can be freely designed. For example, it is possible to use a device measuring the voltage of a series resistance, a device using a current transformer, a device using a Hall current sensor, or the like, but the present invention is not limited thereto.

The calculation unit 41 calculates inductance of each of the electromagnets 25a and 25b based on the detected current value. The calculation unit 41 calculates, based on the inductance, a relative positional relationship between each of the teeth 22a and 22b and the object to be conveyed 110. Furthermore, the calculation unit 41 calculates, based on this positional relationship, the position of the object to be conveyed 110 within the conveyance device 1. In this manner, the conveyance device 1 functions as a detection device configured to detect the position of the object to be conveyed 110 based on a change in inductance of the windings 21a and 21b.

In addition, the calculation unit 41 determines, based on the calculated position of the object to be conveyed 110, the amount of currents to be respectively supplied to the driving circuits 50a and 50b in order to appropriately drive the object to be conveyed 110 and the timing of respectively supplying the currents to the driving circuits 50a and 50b. The calculation unit 41 generates a control signal to move the object to be conveyed 110 based on the determined amount of currents and timing, and outputs the control signal to each of the driving circuits 50a and 50b. The driving circuits 50a and 50b respectively supply currents to the electromagnets 25a and 25b in response to the control signal, thereby making it possible to convey the object to be conveyed 110 to a desired position.

Next, the structure of the teeth 22a and 22b will be described. FIG. 2 is a schematic cross-sectional comparison view showing the configuration of the conveyance device 1. (a) of FIG. 2 shows a configuration example of a tooth 122 according to the related art, and (b) of FIG. 2 shows a configuration example of a tooth 22 according to this embodiment.

Both the conveyance device in (a) of FIG. 2 and the conveyance device 1 in (b) of FIG. 2 include a yoke 26. The yoke 26 magnetically couples a plurality of electromagnets, thereby forming a magnetic circuit. The magnetic circuit is formed through the inner periphery of the winding 21, the yoke 26, and the outer periphery of the winding 21 (that is, formed between two adjacent windings 21).

In (a) of FIG. 2, that is, in the related art, the tooth 122 does not have a cavity. In (b) of FIG. 2, that is, in this embodiment, the tooth 22 has a cavity 27. The cavity 27 is hatched in (b) of FIG. 2. The cavity 27 extends in the axial direction. In this embodiment, the cavity 27 is opened on the surface that does not face the object to be conveyed 110 (for example, toward negative direction of the z-axis).

In (a) of FIG. 2, that is, in the related art, the outer diameter of the end of the tooth 22 is the same as the inner diameter of a hole 28 so that the tooth 22 can be inserted into and fixed to the hole 28 of the yoke 26. In FIG. 2(b), that is, in this embodiment, the cavity 27 has a circular cross-sectional shape in the axial direction. Further, the cavity 27 includes the axis of the tooth 22 (more strictly, the same includes a certain line segment forming the axis of the tooth 22). Particularly, in this embodiment, the axis of the cavity 27 and the axis of the tooth 22 match each other. That is, the central axis of the cavity 27 and the central axis of the tooth 22 are commonly used.

In (b) of FIG. 2, the yoke 26 is provided with a hole 28 having the same inner diameter as that of the cavity 27 of the tooth. In (b) of FIG. 2, the hole 28 is shown in a dot pattern. In this embodiment, the conveyance device 1 includes a non-magnetic body 29 inserted into the cavity 27. For convenience of illustration, (b) of FIG. 2 shows a state in which the non-magnetic body 29 is inserted into only one cavity 27, but in fact, the same non-magnetic body 29 is inserted into each of the cavities 27. For example, the non-magnetic body 29 can be formed as a pin or a screw. The tooth 22 can be fixed to the yoke 26 by allowing the non-magnetic body 29 to be inserted into and fixed to the cavity 27 of the tooth 22 and the hole 28 of the yoke 26.

Here, in the configuration of (b) of FIG. 2, since the cavity 27 is opened on a surface of the tooth 22, the surface not facing the object to be conveyed 110, insertion work of the non-magnetic body 29 can be performed without interfering with the conveyance path, which simplifies the manufacturing process of the conveyance device 1.

Further, in the configuration of (b) of FIG. 2, since the axis of the cavity 27 and the axis of the tooth 22 match each other, symmetry of the whole teeth 22 is maintained, and the design of the magnetic circuit and control is easy.

FIG. 3 is a graph comparing characteristics of thrust and inductance in (a) of FIG. 2, that is, the conveyance device of the related art and (b) of FIG. 2, that is, the conveyance device 1 of this embodiment. The X-axis represents the position of the object to be conveyed 110, X=0 is the axial position of a certain tooth 22, and X=p is the axial position of an adjacent tooth 22. (a) of FIG. 3 shows thrust characteristics, and (b) of FIG. 3 shows inductance characteristics. The calculation unit 41 can calculate, based on the calculated inductance and the relationship shown in (b) of FIG. 3, a relative positional relationship between each tooth and the object to be conveyed 110.

In both (a) and (b) of FIG. 3, an alternate long and short dash line corresponds to the configuration of (a) of FIG. 2, and a solid line corresponds to (b) of FIG. 2, that is, the configuration of this embodiment. When the object to be conveyed 110 moves from X=0 to X=p, thrust and inductance with respect to the position change as shown in FIG. 3.

Looking at the thrust characteristics in (a) of FIG. 3, the thrust is almost the same between (a) and (b) of FIG. 2. On the other hand, looking at the inductance characteristics in (b) of FIG. 3, as compared with (a) of FIG. 2, that is, the case of the related art, in (b) of FIG. 2, that is, the case of this embodiment, a difference between inductance at X=0 and inductance at X=p is large. As described above, the cavity 27 as shown in (b) of FIG. 2 is provided, thereby making it possible to improve accuracy of position detection by increasing a change in inductance while suppressing deterioration in thrust.

It is conceivable that, for example, the area of a surface of the tooth 22, the surface facing the object to be conveyed 110, is substantially maintained, and as such, deterioration in thrust is suppressed. Further, as a reason for a large change in inductance, for example, it is conceivable that the cross-sectional area of the magnetic circuit is reduced by the cavity 27.

As described above, since the cavity 27 is provided, it is possible to improve accuracy of position detection by increasing a change in inductance while keeping the outer diameter of the tooth 22 large and suppressing deterioration in thrust.

Embodiment 2

An embodiment 2 has a configuration in which the cavity penetrates the tooth in the embodiment 1. Hereinafter, the embodiment 2 will be described, but descriptions of portions common to the embodiment 1 may be omitted.

FIG. 4 is a schematic cross-sectional view showing a configuration example of a conveyance device according to the embodiment 2. A cavity 27 penetrates a tooth 22. In the same manner as that of the embodiment 1, the central axis of the cavity 27 coincides with the central axis of tooth 22. One end of the tooth 22 has a reduced outer diameter, and the one end is inserted into a hole 28 of a yoke 26, thereby making it possible to allow the tooth 22 and the yoke 26 to be joined and fixed. Therefore, it is not necessary to use a member (such as a non-magnetic pin or screw) configured to fix the tooth 22 to the yoke 26.

Since the cavity 27 penetrates the tooth 22, the cavity 27 can be used as a coolant flow path. For example, an air blower is installed to blow air into the cavity 27, thereby making it possible to suppress temperature rise of the conveyance device 1 due to heat generation of a winding 21.

FIG. 5 is a view schematically showing the flow of a magnetic flux 170 between the object to be conveyed 110 and the tooth 122 in (a) of FIG. 2, that is, in the example of the related art. FIG. 6 is a view schematically showing the flow of a magnetic flux 70 between the object to be conveyed 110 and the tooth 22 in this embodiment (for example, the same configuration as in (b) of FIG. 2).

As shown in FIG. 6, since the cavity 27 (shown by hatching) penetrates the tooth 22, the area of a facing surface 23 of the tooth 22, the facing surface 23 facing the object to be conveyed 110, is reduced. However, in both cases of FIGS. 5 and 6, most of the magnetic fluxes 70 and 170 do not respectively pass through portions in the vicinity of axes of the facing surfaces 23 and 123, but respectively pass through portions 24 and 124 (or a part of the portions 24 and 124) in the vicinity of the outer peripheries of the facing surfaces 23 and 123. This is because the magnetic fluxes 70 and 170 are likely to pass through a path having a low magnetic resistance and thus penetrate a closer ferromagnetic body. Therefore, as shown in FIG. 6, even if the cavity 27 is configured to penetrate the tooth, the cavity 27 is located in the vicinity of the axis of the facing surface 23 of the tooth 22, thereby making it possible to suppress deterioration in thrust.

Embodiment 3

An embodiment 3 is a configuration in which teeth without cavities are mixed in the embodiment 1 or 2. Hereinafter, the embodiment 3 will be described, but descriptions of portions common to the embodiment 1 or 2 may be omitted.

FIG. 7 is a schematic view showing a configuration example of a conveyance device according to the embodiment 3. The conveyance device includes a tooth 22c according to the embodiment 1 and another tooth 22d. The tooth 22c has a cavity 27 according to the embodiment 1, whereas another tooth 22d does not have the cavity 27. For example, another tooth 22d can have the same configuration as that of the tooth of the related art.

FIG. 8 is a schematic view showing another configuration example of the conveyance device according to the embodiment 3. The conveyance device includes a tooth 22e according to the embodiment 2 and another tooth 22d without the cavity 27. The tooth 22e has the cavity 27 according to the embodiment 2, whereas another tooth 22d does not have the cavity 27.

As described above, the tooth 22c or 22e with the cavity 27 and another tooth 22d without the cavity 27 are mixed, thereby making it possible to take an advantage of each tooth.

The arrangement of the tooth 22c or the tooth 22e and the tooth 22d can be freely designed. For example, the tooth 22c or the tooth 22e having the cavity 27 can be disposed only at a location where highly accurate position detection is required when the object to be conveyed 110 is transferred to an analysis apparatus by a robot arm. In this manner, it is possible to selectively use the conveyance device in the conveyance path in consideration of one area where a thrust is emphasized and another area where a change in inductance is emphasized.

The configuration of the conveyance device is not limited to the examples in FIGS. 7 and 8. For example, three types of teeth 22c, 22d, and 22e may be mixed in one conveyance device.

Embodiment 4

An embodiment 4 shows specific examples of the shapes of the tooth 22 and the cavity 27 that can be used in the embodiments 1 to 3.

FIG. 9 is a schematic cross-sectional view showing various examples of the tooth 22 and the cavity 27 according to the embodiment 4. The outer periphery of the cross section in the axial direction of the tooth 22 has a circular shape in (a1) to (a5) of FIG. 9, and has a square shape in (b1) to (b5) of FIG. 9. In addition, the inner periphery of the cross section in the axial direction of the tooth 22 (that is, shape of the cavity 27) has a circular shape in (a1) of FIG. 9, a square shape in (a2) of FIG. 9, a regular hexagon shape in (a3) of FIG. 9, a square shape in (a4) of FIG. 9 (note that, direction of the cavity 27 with respect to arrangement direction of the tooth 22 is different from that in (a2) of FIG. 9), a regular octagon shape in (a5) of FIG. 9, a square shape in (b1) of FIG. 9, a square shape in (b2) of FIG. 9 (note that, direction of the cavity 27 with respect to the arrangement direction of the tooth 22 is different from that in (b1) of FIG. 9), a regular octagon shape in (b3) of FIG. 9, a circular shape in (b4) of FIG. 9, and a regular hexagon shape in (b5) of FIG. 9.

In any configuration shown in FIG. 9, the cavity 27 (at least a part of the cavity 27) has a shape to be rotationally symmetric with respect to the axis of the tooth 22. In this manner, the characteristics of thrust and inductance do not change depending on the conveyance direction of the object to be conveyed 110, thereby obtaining a desirable configuration.

Further, when the shape of the cavity 27 is plane-symmetric with respect to the xz plane, the characteristics of thrust and inductance do not change depending on the direction of conveyance when the object to be conveyed 110 is conveyed in the y-axis direction, thereby obtaining a desirable configuration. In the same manner, when the shape of the cavity 27 is plane-symmetric with respect to the yz plane, the characteristics of thrust and inductance do not change depending on the direction of conveyance when the object to be conveyed 110 is conveyed in the x-axis direction, thereby obtaining a desirable configuration.

Embodiment 5

An embodiment 5 shows further specific examples of the shapes of the tooth 22 and the cavity 27 that can be used in the embodiments 1 to 3. Particularly, in the embodiments 1 and 2, the shape of the cavity 27 is constant in the axial direction, whereas, in the embodiment 5, the shape of the cavity 27 varies in the axial direction.

FIG. 10 is a schematic cross-sectional view showing various examples of the tooth 22 and the cavity 27 according to the embodiment 5. An alternate long and short dash line indicates the axis of the tooth 22. The axis of the cavity 27 coincides with the axis of the tooth 22 in each example of FIG. 10.

In the example of (a) of FIG. 10, the cavity 27 has a tapered portion 27a provided in the vicinity of an opening end and configured to widen toward the opening end. In the example of (b) of FIG. 10, the cavity 27 has a stepped portion 27b having an enlarged diameter in the vicinity of the opening end. In the example of (c) of FIG. 10, the cavity 27 has a conical portion 27c in the vicinity of the bottom portion.

In any configuration shown in FIG. 10, the cross-sectional shape of the cavity 27 by the cross section perpendicular to the axial direction changes in the axial direction. By changing the cross-sectional shape in this manner, the tooth 22 can be easily manufactured and fixed to the yoke 26.

REFERENCE SIGNS LIST

- 1: conveyance device
- 21, 21a, 21b: winding
- 22, 22a, 22b, 22c, 22e: tooth
- 22d: another tooth
- 23: facing surface
- 24: portion in the vicinity of outer periphery of facing surface
- 25a, 25b: electromagnet
- 26: yoke
- 27: cavity
- 28: hole
- 29: non-magnetic body
- 40a, 40b: current detector
- 41: calculation unit
- 50a, 50b: driving circuit
- 55: power source
- 70: magnetic flux
- 110: object to be conveyed All publications, patents, and patent applications cited in the description are incorporated herein by reference in their entirety.

The invention claimed is:

1. A conveyance device configured to convey an object to be conveyed, wherein
the object to be conveyed is conveyable by a magnetic force,
the conveyance device comprises:
a plurality of electromagnets, each of the electromagnets including a tooth and a winding wound around the tooth, the tooth including a magnetic body;
a yoke configured to magnetically couple the respective electromagnets; and
a driving circuit configured to supply a current to the winding, and
the tooth has a cavity formed to extend in an axial direction, wherein the cavity is opened on a surface of the tooth, the surface not facing the object to be conveyed.

2. The conveyance device according to claim 1, wherein the cavity penetrates the tooth.

3. The conveyance device according to claim 1, further comprising a non-magnetic body inserted into the cavity.

4. The conveyance device according to claim 1, further comprising another tooth, wherein the another tooth does not have the cavity formed to extend in the axial direction.

5. The conveyance device according to claim 1, wherein a cross-sectional shape of the cavity by a cross section perpendicular to the axial direction changes in the axial direction.

6. The conveyance device according to claim 1, further comprising a detection device configured to detect, based on a change in inductance of the winding, a position of the object to be conveyed.

7. The conveyance device according to claim 1, wherein an axis of the cavity and an axis of the tooth match each other.

8. The conveyance device according to claim 1, wherein the cavity has a shape rotationally symmetric with respect to an axis of the tooth.

* * * * *